United States Patent
Jalal et al.

(10) Patent No.: US 10,310,979 B2
(45) Date of Patent: *Jun. 4, 2019

(54) SNOOP FILTER FOR CACHE COHERENCY IN A DATA PROCESSING SYSTEM

(71) Applicant: Arm Limited, Cambridge (GB)

(72) Inventors: Jamshed Jalal, Austin, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,070

(22) Filed: Nov. 13, 2018

(65) Prior Publication Data

US 2019/0079868 A1    Mar. 14, 2019

Related U.S. Application Data

(63) Continuation of application No. 14/965,131, filed on Dec. 10, 2015, now Pat. No. 10,157,133.

(51) Int. Cl.
*G06F 12/0815* (2016.01)
*G06F 12/0831* (2016.01)

(52) U.S. Cl.
CPC ...... *G06F 12/0815* (2013.01); *G06F 12/0833* (2013.01); *G06F 2212/1024* (2013.01); *G06F 2212/1044* (2013.01); *G06F 2212/621* (2013.01)

(58) Field of Classification Search
CPC ............. G06F 12/0815; G06F 12/0833; G06F 2212/1024; G06F 2212/1044; G06F 2212/621

See application file for complete search history.

(56) References Cited

U.S. PATENT DOCUMENTS

| | | | |
|---|---|---|---|
| 2005/0154863 A1* | 7/2005 | Steely, Jr. | G06F 9/383 712/225 |
| 2007/0239941 A1* | 10/2007 | Looi | G06F 12/082 711/146 |
| 2011/0004729 A1* | 1/2011 | Akkawi | G06F 12/0813 711/130 |
| 2014/0032853 A1* | 1/2014 | Lih | G06F 12/0817 711/141 |

* cited by examiner

*Primary Examiner* — Mano Padmanabhan
*Assistant Examiner* — Andrew J Cheong
(74) *Attorney, Agent, or Firm* — Leveque IP Law, P.C.

(57) ABSTRACT

A data processing system, having two or more of processors that access a shared data resource, and method of operation thereof. Data stored in a local cache is marked as being in a 'UniqueDirty', 'SharedDirty', 'UniqueClean', 'SharedClean' or 'Invalid' state. A snoop filter monitors access by the processors to the shared data resource, and includes snoop filter control logic and a snoop filter cache configured to maintain cache coherency. The snoop filter cache does not identify any local cache that stores the block of data in a 'SharedDirty' state, resulting in a smaller snoop filter cache size and simple snoop control logic. The data processing system by be defined by instructions of a Hardware Description Language.

20 Claims, 4 Drawing Sheets

SNOOP FILTER FOR CACHE COHERENCY IN A DATA PROCESSING SYSTEM

PRIORITY CLAIM

This application is a continuation of U.S. patent application Ser. No. 14/965,131 filed on Dec. 10, 2015 which is hereby incorporated herein by reference.

BACKGROUND

Data processing systems, such as a System-on-a-Chip (SoC) may contain multiple processor cores, multiple data caches and shared data resources. In a shared memory system for example, each of the processor cores may read and write to a single shared address space. Cache coherency is an issue in any system that contains one or more caches and more than one device sharing data in a single cached area. There are two potential problems with system that contains caches. Firstly, memory may be updated (by another device) after a cached device has taken a copy. At this point, the data within the cache is out-of-date or invalid and no longer contains the most up-to-date data. Secondly, systems that contain write-back caches must deal with the case where the device writes to the local cached copy at which point the memory no longer contains the most up-to-date data. A second device reading memory will see out-of-date (stale) data.

Snoop filters, which monitor data transactions, may be used to ensure cache coherency.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
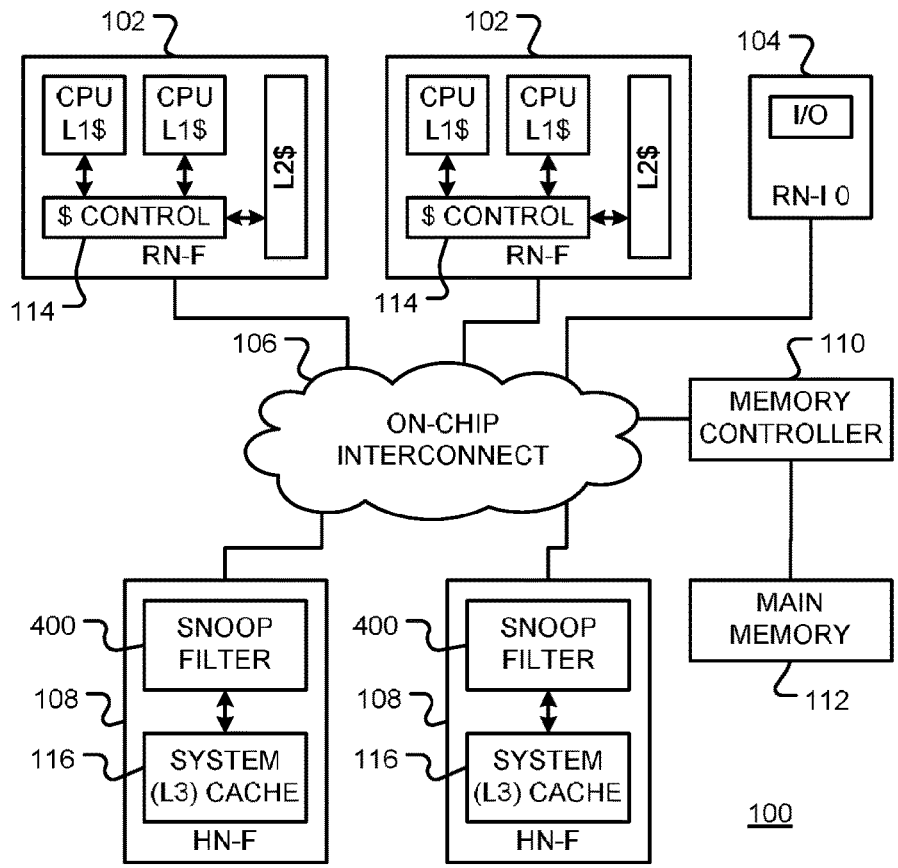
FIG. 1 is a block diagram of a data processing system, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Data processing systems, such as a System-on-a-Chip (SoC) may contain multiple processing devices, multiple data caches and shared data resources. FIG. 1 is a block diagram of a data processing system 100, in accordance with various representative embodiments. The system 100 may be implemented in a System-on-a-Chip (SoC) integrated circuit, for example. In the simplified example shown, the system 100 is arranged as a network with a number of functional block connected together via an interconnect circuit. As shown, the functional blocks include blocks 102 each comprising cluster of processing cores (CPU's) that share an L2 cache, with each processing core having its own L1 cache. Other devices, such as a graphics processing unit (GPU), a digital signal processor (DSP), a field programmable gate array (FPGA) or an application specific integrated circuit (ASIC) device, may be used. In addition, one or more I/O master devices 104 may be included. The blocks 102 and 104 are referred to herein as request nodes (RN's) that may generate requests for data transactions, such as 'load' and 'store', for example. The request nodes are end points for such transactions. The blocks 102 and 104 are coupled via interconnect circuit 106, to data resources that are accessed via home nodes 108 and memory controller 110 that enable the request nodes to access shared main memory 112 or input/output devices. The main memory 112 may be on the chip or external to the chip. Blocks 102 generate data access requests and are referred herein as request nodes (RN's). Devices 108 serve as homes for blocks of data associated with sets of data addresses and are referred to herein as home nodes (HN's). The home nodes respond to data transactions from request nodes and, in responding, may perform data transactions with other functional blocks, such as a memory controller or an I/O device.

Note that many elements of a SoC, such as clocks for example, have been omitted in FIG. 1 for the sake of clarity.

Cache coherency is an issue in any system that contains one or more caches and more than one device sharing data in a single cached area. There are two potential problems with system that contains caches. Firstly, memory may be updated (by another device) after a cached device has taken a copy. At this point, the data within the cache is out-of-date or invalid and no longer contains the most up-to-date data. Secondly, systems that contain write-back caches must deal with the case where the device updates the local cached copy, at which point the memory no longer contains the most up-to-date data. A second device reading memory will see out-of-date (stale) data. Cache coherency may be maintained through use of a snoop filter.

When multiple RN's share a data or memory resource, a coherence protocol may be used, and nodes may be referred to as fully coherent (e.g. RN-F and HN-F) or I/O coherent (e.g. RN-I). Other devices may provide connections to another integrated circuit (e.g. RN-C and HN-C). To maintain coherence, each RN includes a cache controller 114 that accepts load and store instructions from the processor cores. The cache controller 114 also issues and receives coherence requests and responses via the interconnect circuit 106 from other nodes.

Home nodes 108 include a system cache 116. Herein, the system cache 116 is referred to as an L3 cache, however caches at other levels may be used. For example, in a system with multiple caches, the cache 116 may be a lowest or last level cache (LLC). To avoid excessive exchange of messages between the cache controllers 114 of the request nodes 102, a home node 108 also includes a snoop filter 400 that monitors data transactions and maintains the status of data stored in the system cache 116 and operates to maintain coherency of data in the various caches of the system. A home node generally provides an interface to a data resource such as a memory or I/O device. A home node acts as a point of coherence in that it issues coherence responses and receives coherence requests via the interconnect circuit 106 from other nodes. A home node is an intermediate node: it responds to data transaction requests from a request node, and can issue data transaction requests to other devices such as a memory controller. Thus, a home node may act as an intermediary node between a request node and a memory, and may include a cache for temporary storage of data. The snoop filter of a home node functions as a cache controller and a point of coherence. Since memory accesses, for a given set of memory addresses in shared data resource, pass through the same home node, the home node can monitor or 'snoop' on transactions and determine if requested data should be retrieved from a main memory, from a cache in the home node, or from a local cache of one of the request nodes.

Together, snoop filters 400 and cache controllers 114 monitor data transactions and exchange messages to ensure cache coherency. In order to maintain coherency of data in the various local caches, the state of each cache line or block is tracked. For example, data in a local cache, such as cache 116, is said to be in a 'dirty' state if it is the most up-to-date but does not match the data in the memory or lowest level cache. Otherwise, the data is said to be 'clean'. A cache coherence protocol may employ a MOESI cache coherence model, in which the cache data may be in one of a number of states. The states are: Modified (M), Owned (O), Exclusive (E), Shared (S) and Invalid (I).

Modified data, also called 'UniqueDirty' (UD) data, is not shared by other caches. Modified data in a local cache has been updated by a device, but has not been written back to memory, so it is 'dirty'. Modified data is exclusive and owned. The local cache has the only valid copy of the data.

Owned data, also called 'SharedDirty' (SD) data, is shared by other caches. It has not been written back to memory so it is 'dirty'.

Exclusive data, also called 'UniqueClean' (UC) data, is not shared and matches the corresponding data in the memory.

Shared data, also called 'SharedClean' (SC) data, is shared and matches the corresponding data in the memory. Shared data is not exclusive, not dirty, and not owned.

Invalid data is data that has been updated in the memory and/or in another cache, so is out-of-date. Valid data is the most up-to-date data. It may be read but it may only be written if it is also exclusive.

Figure 2:
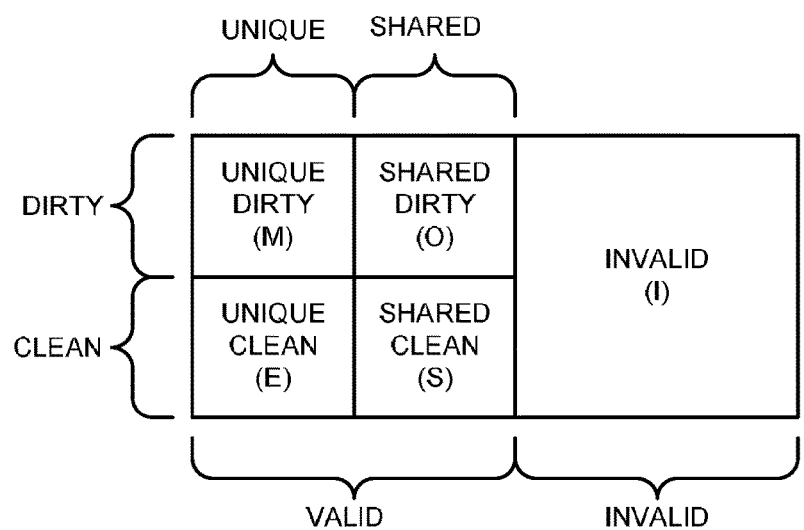
FIG. 2 illustrates states of a cache coherence model, in accordance with various representative embodiments.

FIG. 2 illustrates the various data states under a MOESI cache coherence model. Valid data stored in a local cache may be clean or dirty, unique or shared, giving four possible valid states. In a MESI model the 'Owned' state is omitted and shared data is maintained as clean data.

Figure 3:
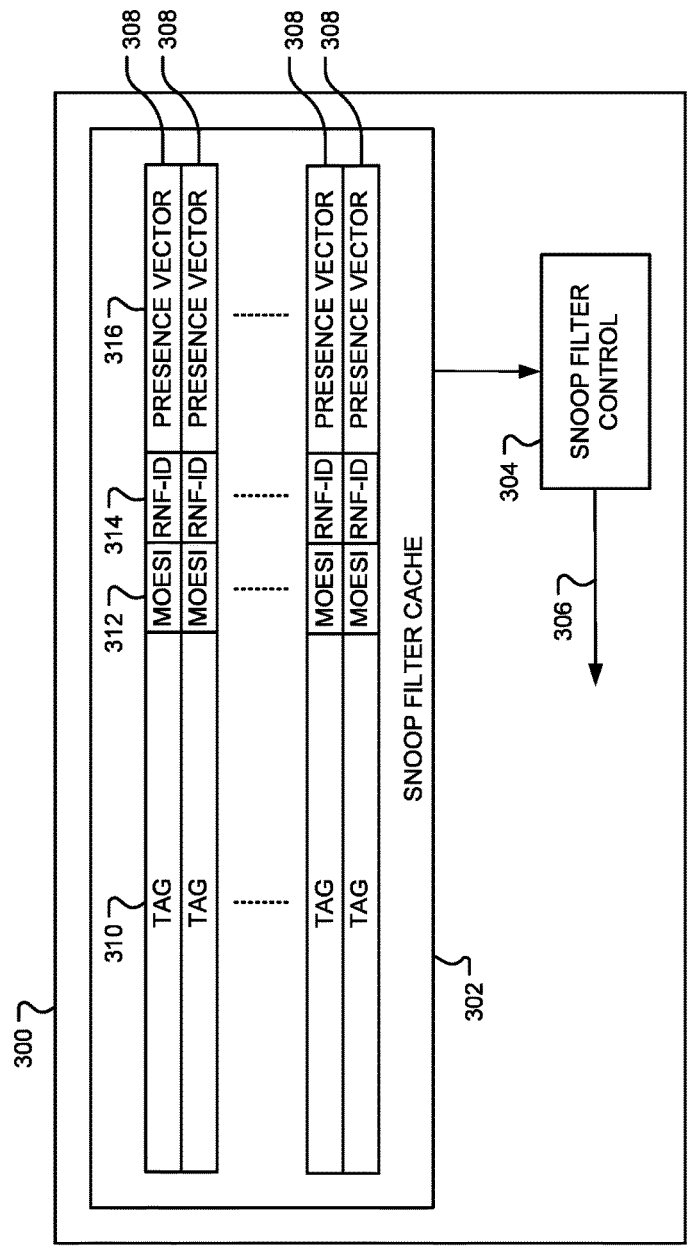
FIG. 3 is a block diagram of a snoop filter of a data cache coherent data processing system.

FIG. 3 is a block diagram of a snoop filter 300 that utilizes a MOESI cache coherence model. The snoop filter 300 includes a snoop filter cache 302 and snoop filter control logic 304 that generates snoop signals at output 306. The snoop signals at output 306 may be directed to a particular node, to a subset of the nodes (multicast), or to all of the nodes (broadcast) to communicate with cache controllers at other nodes. A snoop signal may be a request for data associated with a particular address. Such a snoop signal is referred to simply as a 'snoop'. The snoop filter cache 302 contains a number of records 308 associated with cached data in the system. Each record 308 comprises tag field 310, which identifies the associated data, a cache coherence status field 312 that indicates the MOESI state of the data, an RNF-ID field 314 that identifies the owner of any Shared-Dirty (SD) or Owned data, and a presence vector 316. The presence vector 316 contains bits that indicate which nodes of the system have the data in their local cache. Thus, snoop filters of this kind keep track, in field 314, of the owner of SharedDirty (SD) data in addition to all of the sharers of the data. The owner of the SD data is a device such as a Request Node for CPU cluster, GPU, DSP etc. Tracking of the owners uses tag storage in the snoop filter in addition to associated logic.

In a MOESI cache coherence model, the snoop filters must track which node is the owner of SD (SharedDirty) data. That is, data that is shared between multiple RNF's (such as multiple CPU clusters) in the snoop filter. This is illustrated by the sequence of operations in TABLE 1, for example.

TABLE 1

| | Operation(node) | RNF0 | RNF1 | System cache | SF state | SF presence | SF SD RNFID |
|---|---|---|---|---|---|---|---|
| 1 | ReadUnique(0) | UD | — | — | UC | 01 | — |
| 2 | Read(1) | SD | SC | Clean | SD | 11 | RNF0 |
| 3 | WriteBack(0) | I | SC | Dirty | SC | 10 | — |

In this example, request node RNF0 performs a cacheable store to a coherent memory (at address A) and then performs a ReadUnique operation at line 1 of TABLE 1, to obtain exclusive ownership of a line, and installs the line in a dirty (UD) state in the RNF0 cache (its L1 or L2 cache for example). This transaction will mark RNF0 as Exclusive owner in HNF snoop filter for address A. The snoop filter records the data as UniqueClean (UC) and updates the presence vector (SF presence) to indicate that RNF0 has a copy of the data.

Next, at line 2, another request node, RNF1, performs a cacheable read to the same memory location (address A). This causes the HNF snoop filter to send a snoop to RNF0 for address A, since the snoop filter indicates that the data is in the cache of RNF0. The state in the snoop filter is updated to "SD" and the identifier of the data (SD RNFID) is updated to RNF0. Note that system cache is filled and the data in the system cache is marked 'clean'. The SF indicates that there is an upstream cache with dirty data, which in this case is RNF0. This SD marking requires additional storage in the snoop filter (as indicated by field 314 in FIG. 3).

In response to the snoop, RNF0 downgrades the data in its cache to state SD (also in line 2 of the table) and provides data with snoop response. RNF1 receives the cache data in the SC state (either through the interconnect or from RNF0 directly).

At this point, the HNF snoop filter will mark both RNF0 and RNF1 as a sharer of the cache data, as indicated by the SF presence vector in line 2 of the table.

Any further coherent read operations to address A, by any other RNF, will send a snoop to RNF0 to get the data.

As shown in line 3 of TABLE 1, a subsequent WriteBack from RNF0 clears the presence in SF and will install the data in the system cache, marked 'dirty'.

If the snoop filter does not have SD marking for RNF0 the HNF must snoop all the sharers for address A until one RNF is found that can provide data. If the data cannot be provided, the data is obtained via the memory controller (MC). Snooping the sharers may be performed by broadcasting a snoop to all sharers for coherent reads or by snooping sharers one at a time until one RNF is found to provide the data. Similarly, other operations, such as a 'CleanShared' cache maintenance operation (CMO) and a 'Persistent' CMO for example, may generate a broadcast snoop.

One problem with the MOESI cache coherence protocol described above is that the 'SharedDirty' (SD) tracking requires extra storage in the snoop filter tag in addition to tracking the RNF presence vectors.

In accordance with various embodiments of the disclosure, a snoop filter is provided that does not track the owned or 'SharedDirty' (SD) state in the snoop filter. However, the snoop filter may operate with devices that use a MOESI cache coherence model. Data stored in and transferred between caches is marked with a MOESI state, but the owner of SD data is not recorded in the snoop filter.

Figure 4:
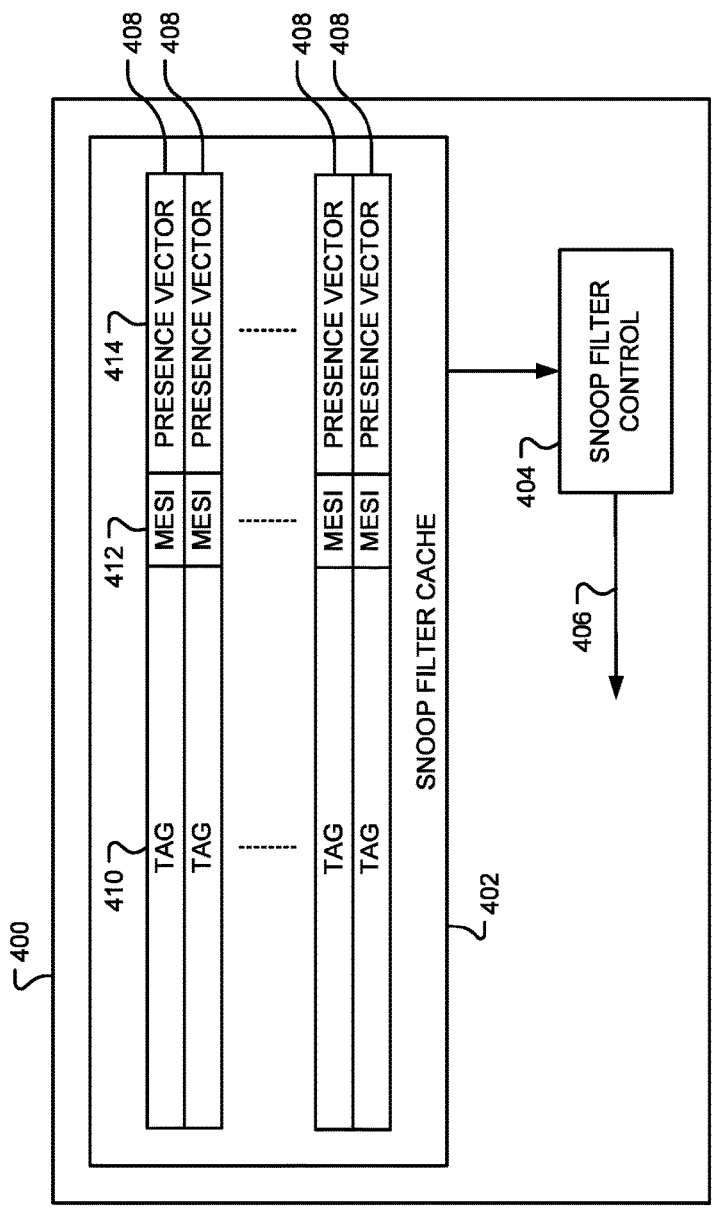
FIG. 4 is a block diagram of a snoop filter of a data cache coherent data processing system, in accordance with various representative embodiments.

FIG. 4 is a block diagram of a snoop filter 200, in accordance with various embodiments. The filter is configured to work with data states that follow a MOESI or MESI model. The snoop filter 200 includes a snoop filter cache 402 and snoop filter control logic 404 that generates snoop commands at output 406. The snoop commands at output 406 may be directed to a particular node, to a subset of the nodes, or to all of the nodes to enable snoop filters at other nodes to be maintained. The snoop filter cache 402 contains a number of records 408 associated with cached data lines in the system. Each record 408 comprises tag field 410, which identifies the data block, a cache coherence status field 412 that indicates only the MESI state of the data line, and a presence vector 414. The presence vector 414 contains bits that indicate which nodes of the system have the data line in their local cache. In contrast with the snoop filter in FIG. 3, the RNF-ID field 314 and the associated logic are not required.

Systems, such as that shown in FIG. 1, are often constructed in a modular manner and are built up from functional logic blocks that may be independently designed and tested. Coupling between the blocks is facilitated by defining standard interfaces and interface protocols. When a protocol is modified or a new protocol introduced, it is advantageous for the protocol to provide backward compatibility with previous protocols so as to enable previously designed functional logic blocks to be reused.

For example, the cache controller in a request node (114 in FIG. 1) may use a MOESI cache coherency model but it may be desirable for it to be operable with an interconnect and home nodes that do not track the owner of data in the SD state.

In accordance with various embodiments, there is provided a snoop filter that does not require the use of an RNF-ID field for 'SharedDirty' (SD) cache data but is compatible with devices that use a MOESI cache coherence model.

In accordance with various embodiments, a home node (HNF) of data processing system has snoop filter and system cache. The snoop filter is compatible with devices that use a MOESI cache coherence model but does require storage or logic in the snoop filter tag and snoop filter control to implement SD tracking.

Figure 5:
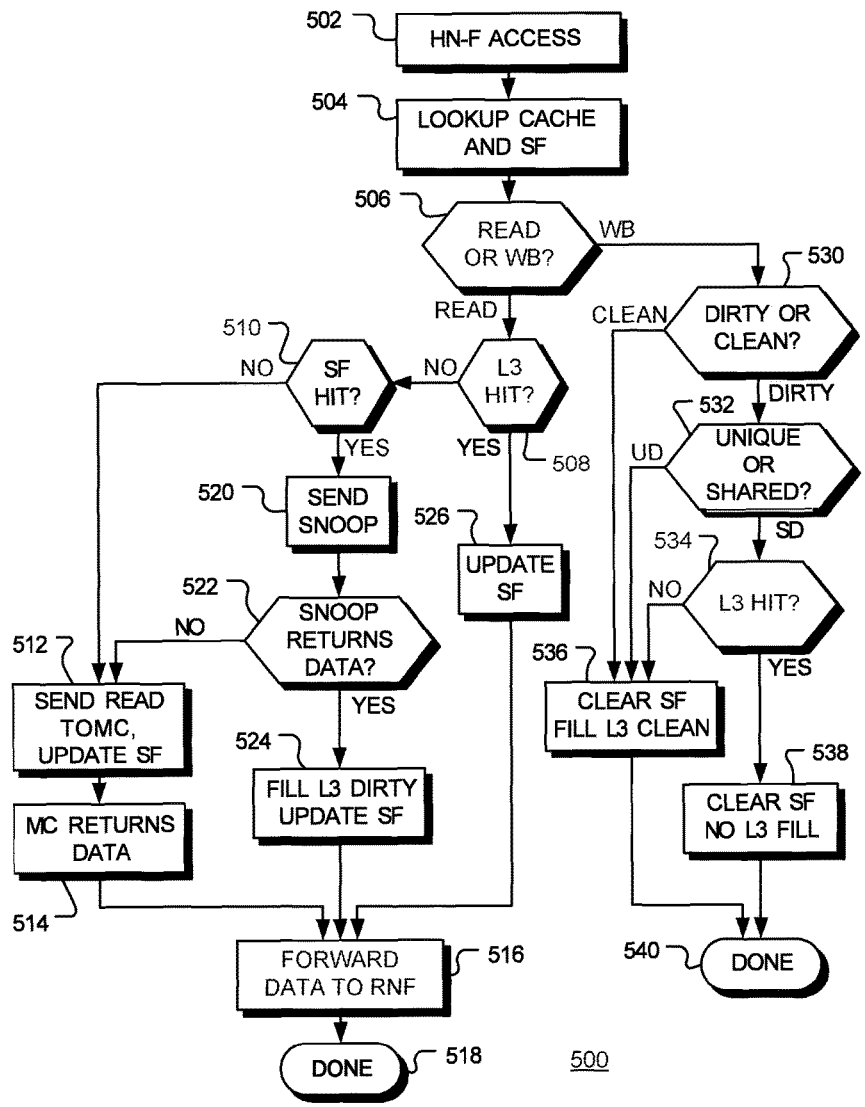
FIG. 5 is a flow chart of a method of operation of a snoop filter of a data cache coherent data processing system, in accordance with various representative embodiments.

FIG. 5 is a flow chart 500 of a method of operation of a snoop filter control logic of a snoop filter of a fully-coherent home node (HN-F) of a data processing system, in accordance with various embodiments. Following, at block 502, a request, sent from an RN-F to the HN-F, to access data at an address in system memory, the address is looked-up in the system cache of the HN-F and in the snoop filter (SF) at block 504. If the request is a read request, as depicted by the 'READ' branch from decision block 506, flow continues to decision block 508. If the address is not found in the cache (a cache 'miss'), as indicated by the negative branch from decision block 508, flow continues to decision block 510 to determine, from the snoop filter, if any other caches contain the requested data. If the address is not found in the snoop filter (a snoop filter 'miss'), as depicted by the negative branch from decision block 510, a signal to read the data from memory is sent to a memory controller at block 512, and the snoop filter is updated. The data is received from the memory controller at block 514 and forwarded to the requesting RN-F at block 516. This completes the response as indicated by block 518.

If the address is found in the snoop filter (a snoop filter 'hit'), as indicated by the positive branch from decision block 510, the data is stored in a RN-F cache and a snoop is sent at block 520 to the corresponding RN-F. The snoop is sent to all nodes that share the data. If the response to the snoop fails to return the requested data, as depicted by the negative branch from decision block 522, flow continues to block 512 to retrieve the data from the memory using the memory controller. If, in response to the snoop, the RN-F provides the data, as indicated by the positive branch from decision block 522, the data is stored in the system cache at block 524 and the state of the cache data is marked in the snoop filter as 'dirty'. By updating the system cache at block 524, the data in the local caches of the request node is guaranteed to be clean, thus, there is no requirement to identify the owner of shared dirty data. Flow then continues to block 516. Any subsequent read request will not generate any snoop and the data will be provided from the system cache. The owner of the data is not marked.

If the address is found in the cache (a cache 'hit'), as indicated by the positive branch from decision block 508, the data is already stored in the system cache of the HN-F node. The snoop filter (SF) is updated at block 526 to indicate that the requesting RN-F will have a copy of the data and the data is forwarded to the RN-F node at block 516.

If the request is a write-back request, as depicted by the 'WB' branch from decision block 506, flow continues to decision block 530. If the state of the write-back data is clean, as depicted by the 'CLEAN' branch from decision block 530, or the state is 'UniqueDirty', as depicted by the 'UD' branch from decision block 532, or the data is not already in the system cache, as depicted by the negative branch from decision block 534, flow continues to block 536 where the corresponding entry in the snoop filter directory is cleared and the data is stored in the system cache and marked as 'clean'. If the state of the write-back data is 'SharedDirty' and already in the system cache, as depicted by the positive branch from decision block 534, the corresponding entry in the snoop filter directory is cleared at block 538 but the data is not written to the system cache. This approach ensures that memory is only written once. Conversely, if the 'dirty' data was stored in the cache, the HN-F would be required to perform an additional write-back to memory. This is not needed, thus avoiding unnecessary memory control traffic. The method terminates at block 540.

The method depicted in FIG. 5 avoids broadcast snoops or complex control logic of snooping one RN-F at a time until one is found before going to the memory controller.

The above mechanism enable snoop filter tag storage to be reduced and, in addition, reduces the number of broadcast snoops with cache maintenance operations, in some cases.

TABLE 2 illustrates an example of a sequence of operations and the resulting states. In this example, request node RNF0 performs a cacheable store to a coherent memory (at address A) and then performs a 'ReadUnique' operation at line 1 of TABLE 2, to obtain exclusive ownership of a line, and installs the line in a dirty (UD) state in the RNF0 cache (its L1 or L2 cache for example). The snoop filter records the data as UniqueClean (UC) and updates the presence vector (SF presence) to indicate that RNF0 has a copy of the data.

Next, at line 2, another request node, RNF1, performs a cacheable read to the same memory location (address A). This causes the HNF snoop filter to send a snoop to RNF0 for address A, since the snoop filter presence vector indicates that the data is in the cache of RNF0. The state in the snoop filter is updated to "SC", but no identifier of the owner is recorded. In response to the snoop, RNF0 downgrades the data in its to cache to state SD (also in line 2 of the table) and provides data with snoop response. RNF1 receives the cache data in the SC state (either through the interconnect or from RNF0 directly).

The system cache is filled and the data in the system cache is marked 'dirty', since the home node determines that the data store RNF0 should now be the SD state. At this point, the HNF snoop filter will mark both RNF0 and RNF1 as a sharer of the cache data, as indicated by the SF presence vector in line 2 of the table.

Any further coherent read operations to address A, by any other RNF, will send a snoop to RNF0 and/or RNF1 to get the data, since both are indicated as sharers in the SF presence vector.

What happens when a subsequent WriteBack request is received from RNF0 is determined by whether the corresponding data remains in the system cache of the home node, or whether it has been evicted from the cache. If evicted, the data will have been written back to the memory since it was marked as 'dirty'.

Line 3 of TABLE 2, shows what happens when a subsequent WriteBack request is received from RNF0 after the data has been evicted from the system cache. The writer-Back request again indicates that the data is in an SD state from RNF0. The snoop filter state is SC, which indicates to the snoop filter control logic that the system cache previously held a 'dirty' copy of the data and has evicted it to memory. There is no purpose to save the data in the system cache in a 'dirty' state, since the memory has already updated. Hence, the system cache is filled 'clean'. The presence vector in the SF is updated, to indicate that RNF0 no longer shares the data, and the data is stored in the system cache and marked 'dirty'. RNF0 updates the state of the data in its local cache to 'Invalid'.

Line 4 of TABLE 2, shows what happens when a subsequent WriteBack request is received from RNF0 before the data has been evicted from the system cache. The snoop controller determines that the data is already in the system cache in a 'dirty' state, and so the data is dropped and no changes are made to the cache. The snoop filter presence vector is updated to indicate that RNF0 no longer shares the data. RNF0 updates the state of the data in its local cache to 'Invalid'.

TABLE 2

| | Operation(node) | RNF0 | RNF1 | System cache | SF state | SF presence |
|---|---|---|---|---|---|---|
| 1 | ReadUnique(0) | UD | — | — | UC | 01 |
| 2 | Read(1) | SD | SC | Dirty | SC | 11 |
| 3 | WriteBack(0) (cache miss) | I | SC | Clean | SC | 10 |
| 4 | WriteBack(0) (cache hit) | I | SC | Dirty | SC | 10 |

In the approach described above, a snoop filter state 'SD' is not used and the owner ID is not recorded or tracked by the snoop filter, thereby reduce the size of the snoop filter cache and simplifying the snoop filter control logic.

It will be appreciated that some or all functions described herein could be implemented by custom logic, such a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present invention has been described in terms of exemplary embodiments, but it is not so limited. The present invention could be implemented using hardware components, such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following numbered items:
1. A method of data transfer in a data processing system having a shared data resource and a network of a plurality of nodes, the shared data resource accessible by a plurality of request nodes of the network via a home node of the network, the method comprising: responsive to a read request, received at the home node from a first request node of the plurality of request nodes, for data stored at a system address in the shared data resource, determining if the requested data is stored in a cache of the home node or in a local cache of one or more second request nodes of the plurality of request nodes; when the requested data is not stored in a cache of the home node but is stored in a local cache of one or more second request nodes: sending a snoop to the one or more second request nodes to request the data; when data is returned in response to the snoop, storing the cache of the home node with the returned data, marking the data in the cache as 'dirty' and updating a snoop filter of the home node to indicate that the first request node has a copy the data; and forwarding the returned data to the first request node, when the requested data is not stored in the cache of the home node or in a local cache of one or more second request nodes: retrieving the requested data from the shared data resource; updating the snoop filter of the home node to indicate that the first request node has a copy the data; and forwarding the retrieved data to the first request node, and when the requested data is stored in the cache of the home node: updating a snoop filter of the home node to indicate that the first request node has a copy the data; and forwarding the retrieved data to the first request node.
2. The method of item 1, where the data forwarded to the first request node is marked as being in a 'UniqueDirty' state.
3. The method of item 1, where data is stored in a local cache of the plurality of request nodes is marked as being in a 'UniqueDirty', 'SharedDirty', 'UniqueClean', 'SharedClean' or 'Invalid' state.
4. The method of item 3, where data in a local cache of the first request node the snoop is marked as being in a 'SharedDirty' state, and where the snoop filter does not identify the first request node.
5. The method of item 1, where updating the snoop filter of the home node to indicate that the first request node has a copy the data comprises updating a presence vector in the snoop filter.
6. The method of item 1, where sending a snoop to the one or more second request nodes to request the data cause a second request node to update data in its local cache from an 'UD' state to an 'SD' state.
7. The method of item 1, further comprising: responsive to a write-back request, received at the home node from the first request node of the plurality of request nodes, to write-back data stored to a system address in the shared data resource, determining a state of the write-back data; when the state of the data is in a 'clean' or 'unique' state or when no data associated with the system address is stored in the cache of the home node, storing the write-back as 'clean' data in the cache of the home node; when data associated with the system address is already stored in the cache of the home node, dropping the write-back data without storing it in the cache of the home node; and updating a presence vector in the snoop filter.
8. The method of item 7, further comprising, when data in the cache of the home node is marked as 'dirty' is evicted from the cache of the home node, writing the data back to the shared data resource.
9. The method of item 7, further comprising the first request node of the plurality of request nodes marking a copy of data to be written-back as 'Invalid' in its local cache.
10. A snoop filter for a data processing system, the data processing system further comprising: a plurality of processors each having a local cache and a cache controller; and a shared data resource; and a system cache; where the snoop filter monitors access by the plurality of processors to the shared data resource, and where the snoop filter comprises: snoop filter control logic operable to communicate with the cache controllers of the plurality of processors; and a snoop filter cache operable to store, for each block of data in a local cache of a processor of the plurality of processors: a tag that identifies the block of data; an indication if the block of data 'UniqueDirty', 'UniqueClean', 'SharedClean' or 'Invalid' state; and a presence vector indicative of which local caches share copies of the block of data, where the snoop filter cache does not identify any local cache that stores the block of data in a 'SharedDirty' state and where the snoop filter control logic is configured to perform the method of item 7.
11. A non-transient computer readable medium containing instructions of a Hardware Description Language that define the data processing system of item 10.

12. The method of item 1, where retrieving the requested data from the shared data resource comprises: a controller of the snoop filter sending a read request to a memory controller via an interconnect circuit; the memory controller accessing data stored in a memory at the system address; and the memory controller returning the accessed data to the home node via the interconnect circuit.

13. A snoop filter for a data processing system, the data processing system comprising: a plurality of processors each having a local cache and a cache controller; and a shared data resource; and a system cache; where the snoop filter monitors access by the plurality of processors to the shared data resource, where data, from the shared data resource, stored in a local cache of a processor of the plurality of processors is marked as being in a 'UniqueDirty', 'SharedDirty', 'UniqueClean', 'SharedClean' or 'Invalid' state, where data, from the shared data resource, stored in the system cache is marked as being in a 'dirty' state if it does not match corresponding data in the shared data resource and marked as 'clean' otherwise, and where the snoop filter comprises: snoop filter control logic operable to communicate with the cache controllers of the plurality of processors; and a snoop filter cache operable to store, for each block of data in a local cache of a processor of the plurality of processors: a tag that identifies the block of data; an indication if the block of data 'UniqueDirty', 'UniqueClean', 'SharedClean' or 'Invalid' state; and a presence vector indicative of which local caches share copies of the block of data; where the snoop filter cache does not identify any local cache that stores the block of data in a 'SharedDirty' state.

14. A non-transient computer readable medium containing instructions of a Hardware Description Language that define the data processing system of item 13.

15. A data processing system comprising: a plurality of processors each having a local cache and a cache controller, where data stored in a local cache of a processor of the plurality of processors is marked as being in a 'UniqueDirty', 'SharedDirty', 'UniqueClean', 'SharedClean' or 'Invalid' state; a system cache, where data stored in the system cache is marked as being in a 'dirty' state if it does not match corresponding data in a shared data resource and marked as 'clean' otherwise, where the shared data resource is accessible by the plurality of processors; and a snoop filter configured to monitor access by the plurality of processors to the shared data resource, where the snoop filter comprises: snoop filter control logic operable to communicate with the cache controllers of the plurality of processors to maintain cache coherency; and a snoop filter cache operable to store, for each block of data in a local cache of a processor of the plurality of processors: a tag that identifies the block of data; an indication if the block of data 'UniqueDirty', 'UniqueClean', 'SharedClean' or 'Invalid' state; and a presence vector indicative of which local caches share copies of the block of data; where the snoop filter cache does not identify any local cache that stores the block of data in a 'SharedDirty' state.

16. The data processing system of item 15, where the data processing system consists of an integrated circuit.

17. The data processing system of item 15, further comprising a memory controller, where the shared data resource comprises a memory accessible via the memory controller.

18. The data processing system of item 15, further comprising an interconnect circuit, where the data processing system is configured as network of nodes coupled by the interconnect circuit, where: a request node of the network comprise a processor of the plurality of processors, with its local cache and cache controller; and a home node of the network comprises the snoop filter and the system cache.

19. A System-on-a-Chip comprising the data processing system of item 15.

20. A non-transient computer readable medium containing instructions of a Hardware Description Language that define the data processing system of item 15.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

We claim:

1. A method of data transfer in a data processing system having a shared data resource and a network comprising a plurality of nodes, the shared data resource accessible by a plurality of request nodes of the network via a home node of the network, where a home node serves as a home for data associated with a set of data addresses where the plurality of nodes access the shared data resource via the home node, the method comprising:
   receiving, by the home node, a read request for data stored at a system address in the shared data resource, where the read request is sent to the home node by a first request node of the plurality of request nodes;
   responsive to the read request, the home node:
      determining, by a snoop filter controller of the home node, if the requested data is stored in a cache of the home node or in a local cache of a second request node of the plurality of request nodes;
      when the requested data is not stored in a cache of the home node but is stored in a local cache of the second request node:
         retrieving the requested data from the second request node;
         storing the returned requested data to the cache of the home node, marking the returned requested data in the cache as 'dirty' to indicate that the returned requested data has not been written back to the shared data resource in response to the read request and updating a snoop filter of the home node to indicate that the first request node has a copy of the requested data; and
         forwarding the returned requested data to the first request node.

2. The method of claim 1, where retrieving the requested data from the second request node comprises:
   sending, by the snoop filter controller of the home node, a snoop to the second request node to request the requested data, and
   receiving, by the home node, the requested data in a response to the snoop.

3. The method of claim 2, where sending the snoop to the second request node to request the requested data causes the second request node to update the copy of the requested data in its local cache from a 'UniqueDirty' state to a 'SharedDirty' state.

4. The method of claim 1, further comprising:
   when the requested data is not stored in the cache of the home node and not in a local cache of one or more second request nodes:
      retrieving the requested data from the shared data resource;

updating the snoop filter of the home node to indicate that the first request node has the copy of the requested data; and
forwarding the retrieved requested data to the first request node, and
when the requested data is stored in the cache of the home node:
retrieving the requested data from the cache of the home node;
updating the snoop filter of the home node to indicate that the first request node has the copy of the requested data; and
forwarding the retrieved requested data to the first request node.

5. The method of claim 4, where retrieving the requested data from the shared data resource comprises:
the controller of the snoop filter sending a read request to a memory controller via an interconnect circuit;
the memory controller accessing data stored in a memory at the system address; and
the memory controller returning the accessed data to the home node via the interconnect circuit.

6. The method of claim 4, where updating the snoop filter of the home node to indicate that the first request node has the copy of the requested data comprises updating a presence vector in the snoop filter, where retrieved data in a local cache of the first request node is marked as being in a 'SharedDirty' state, and where the snoop filter does not identify the first request node as an owner of the requested data.

7. The method of claim 4, where updating the snoop filter of the home node to indicate that the first request node has the copy of the requested data comprises updating a presence vector in the snoop filter.

8. The method of claim 1, where the requested data forwarded to the first request node is marked as being in a 'UniqueDirty' state.

9. The method of claim 1, where the requested data stored in a local cache of the plurality of request nodes is marked as being in a 'UniqueDirty', 'SharedDirty', 'UniqueClean', 'SharedClean' or 'Invalid' state.

10. A method of data transfer in a data processing system having a shared data resource and a network comprising a plurality of nodes, the shared data resource accessible by a plurality of request nodes of the network via a home node of the network, where a home node serves as a home for data associated with a set of data addresses where the plurality of nodes access the shared data resource via the home node, the method comprising:
receiving, by the home node, a write-back request from a first request node of the plurality of request nodes, to store write-back data to a system address in the shared data resource;
responsive to the write-back request, the home node:
determining a state of the write-back data;
when the state of the write-back data is in a 'clean' or 'unique' state or when, upon receipt of the write-back request, no data associated with the system address is stored in a cache of the home node, storing the write-back data as 'clean' data in the cache of the home node;
when write-back data is already stored in the cache of the home node, dropping the write-back data without storing it in the cache of the home node; and
updating a presence vector in a snoop filter of the home node;

receiving, by the home node, a read request for data stored at the system address in the shared data resource, where the read request is sent to the home node by the first request node of the plurality of request nodes; and
responsive to the read request, the home node, when the requested data is not stored in the cache of the home node but is stored in a local cache of the second request node:
retrieving the requested data from the second request node;
storing the cache of the home node with the returned requested data, marking the returned requested data in the cache as 'dirty' to indicate that the returned requested data has not been written back to the shared data resource in response to the read request and updating the snoop filter of the home node to indicate that the first request node has a copy of the requested data; and
forwarding the returned requested data to the first request node.

11. The method of claim 10, further comprising, when data in the cache of the home node marked as 'dirty' is evicted from the cache of the home node, writing the evicted data back to the shared data resource.

12. The method of claim 10, further comprising the first request node of the plurality of request nodes marking a copy of the write-back data as 'Invalid' in its local cache.

13. The method of claim 10, further comprising
responsive to the read request, the home node:
determining, by a snoop filter controller of the home node, if the requested data is stored in the cache of the home node or in the local cache of a second request node of the plurality of request nodes.

14. The method of claim 13, further comprising:
when the requested data is not stored in the cache of the home node and not in a local cache of one or more second request nodes:
retrieving the requested data from the shared data resource;
updating the snoop filter of the home node to indicate that the first request node has the copy of the requested data; and
forwarding the retrieved requested data to the first request node, and
when the requested data is stored in the cache of the home node:
retrieving the requested data from the cache of the home node;
updating the snoop filter of the home node to indicate that the first request node has the copy of the requested data; and
forwarding the retrieved requested data to the first request node.

15. A data processing system comprising:
a home node configured to monitor access, by a plurality of processors of the data processing system, to a set of addresses in a shared data resource; and
a snoop filter of the home node, the snoop filter comprising a snoop filter cache coupled to the home node,
where the home node comprises a system cache and a snoop filter,
where each processor of the plurality of processors has a local cache and a cache controller, and
where, when data requested by a first processor of the plurality of processors is retrieved by the home node from a second processor of the plurality of processors and forwarded to the first processor, the requested data retrieved from the second processor is also stored in the system cache and marked as being in a 'dirty' state to indicate that the requested data has not been written back to the shared data resource in response to the data request; and where the snoop filter cache does not distinguish between a local cache that stores the block of data in a 'SharedDirty' state and local caches that store the block of data in a 'SharedClean' state.

16. The data processing system of claim 15, further comprising the plurality of processors, where data, from the shared data resource, stored in the local cache of a processor of the plurality of processors is marked as being in a 'UniqueDirty', 'SharedDirty', 'UniqueClean', 'SharedClean' or 'Invalid' state, and where the snoop filter of the home node further comprises:

snoop filter control logic operable to communicate with the cache controllers of the plurality of processors; and the snoop filter cache operable to store, for each block of data in the local cache of the processor of the plurality of processors:

a tag that identifies the block of data;

an indication if the block of data is in the 'UniqueDirty', 'UniqueClean', 'SharedClean' or 'Invalid' state; and a presence vector indicative of which local caches have copies of the block of data.

17. The data processing system of claim 16, where the data processing system consists of an integrated circuit.

18. The data processing system of claim 15, further comprising an interconnect circuit, where the data processing system is configured as network of nodes coupled by the interconnect circuit, and where:

a request node of the network comprises a processor of the plurality of processors, with its local cache and cache controller; and a home node of the network comprises the snoop filter and the system cache, where the home node serves as a home for data associated with a set of data addresses.

19. The data processing system of claim 15, further comprising a memory controller, where the shared data resource comprises a memory accessible via the memory controller.

20. A non-transient computer readable medium containing instructions of a Hardware Description Language that define the data processing system of claim 15.

* * * * *